(12) United States Patent
Hurwitz (10) Patent No.: US 7,263,816 B2
(45) Date of Patent: ***Sep. 4, 2007

(54) OMNIDIRECTIONALLY REFLECTIVE HORSE HALTER

(75) Inventor: Marni Markell Hurwitz, Far Hills, NJ (US)

(73) Assignee: Nite Glow Industries, Inc., Far Hills, NJ (US)

( * ) Notice: Subject to any disclaimer, the term of this patent is extended or adjusted under 35 U.S.C. 154(b) by 48 days.

This patent is subject to a terminal disclaimer.

(21) Appl. No.: 11/094,668

(22) Filed: Mar. 30, 2005

(65) Prior Publication Data

US 2006/0026933 A1 Feb. 9, 2006

Related U.S. Application Data (63) Continuation-in-part of application No. 10/935,687, filed on Sep. 8, 2004, now Pat. No. 6,925,965.

(60) Provisional application No. 60/591,936, filed on Jul. 28, 2004.

(51) Int. Cl.
*B68B 1/02* (2006.01)
(52) U.S. Cl. ......................................................... 54/24
(58) Field of Classification Search .................... 54/24, 54/85; 119/712, 792, 793, 795, 797, 798
See application file for complete search history.

(56) References Cited

U.S. PATENT DOCUMENTS

| 3,176,584 | A | 4/1965 | Vries ................................. 88/82 |
| 3,190,178 | A | 6/1965 | McKenzie ........................ 88/82 |
| 3,871,336 | A | 3/1975 | Bergman ...................... 119/106 |
| 3,999,521 | A | 12/1976 | Puiello ........................... 119/96 |
| 4,025,159 | A | 5/1977 | McGrath ....................... 350/105 |
| 4,094,131 | A * | 6/1978 | McElvey ......................... 54/24 |
| 4,167,156 | A | 9/1979 | Kupperman et al. .......... 119/109 |
| 4,173,201 | A | 11/1979 | Chao et al. .................... 119/106 |
| 4,384,548 | A | 5/1983 | Cohn ........................... 119/109 |
| 4,407,233 | A | 10/1983 | Bozzacco ..................... 119/106 |
| 4,513,692 | A | 4/1985 | Kuhnsman et al. ........... 119/109 |

(Continued)

FOREIGN PATENT DOCUMENTS

JP 408023814 A * 1/1996

(Continued)

*Primary Examiner*—Son T. Nguyen
(74) *Attorney, Agent, or Firm*—Ernest D. Buff & Associates; Ernest D. Buff; Theodore J. Pierson (57) ABSTRACT

A flexible omnidirectionally reflective horse lead has a central portion, and mechanical attachment means to accommodate a bridal bit ring. The lead reflects an incoming light beam from a walker or horseback rider back in the direction from which it emanated, preventing dangerous encounters during dusk or nighttime hours. The omnidirectionally reflective elements may be incorporated in a horse harness, or in a halter suitable for horses roaming in a paddock or field. The reflective elements are created by surrounding a central braided rope of nylon or polyethylene fibers with a cylindrically braided reflective sleeve. The braided reflective sleeve is composed of narrow width reflective strips thermally bonded to a flexible polymeric sheet with attached corner cube or microsphere retroreflectors. Due to its braided construction, the reflective elements reflect light omnidirectionally over a large angle of acceptance, illuminating the horse harness or halter. An improved measure of safety is thereby provided for both the horse and the horseback rider.

15 Claims, 8 Drawing Sheets

Fig. 5

U.S. PATENT DOCUMENTS

| Patent | Date | Inventor | Class |
|---|---|---|---|
| 4,576,850 A | 3/1986 | Martens | 428/156 |
| 4,582,885 A | 4/1986 | Barber | 528/28 |
| 4,668,558 A | 5/1987 | Barber | 428/156 |
| 4,763,985 A | 8/1988 | Bingham | 350/105 |
| 4,887,552 A | 12/1989 | Hayden | 119/109 |
| 4,895,110 A | 1/1990 | LoCascio | 119/106 |
| 4,957,335 A | 9/1990 | Kuney, Jr. | 350/105 |
| 5,046,456 A | 9/1991 | Heyman et al. | 119/106 |
| 5,066,098 A | 11/1991 | Kult et al. | 359/540 |
| 5,117,304 A | 5/1992 | Huang et al. | 359/529 |
| 5,140,946 A | 8/1992 | Pennock et al. | 119/106 |
| 5,200,262 A | 4/1993 | Li | 428/266 |
| 5,243,457 A | 9/1993 | Spencer | 119/795 |
| 5,283,101 A | 2/1994 | Li | 428/141 |
| 5,370,082 A | 12/1994 | Wade | 119/859 |
| 5,429,075 A | 7/1995 | Passarella et al. | 119/795 |
| 5,523,927 A | 6/1996 | Gokey | 362/103 |
| 5,535,106 A | 7/1996 | Tangen | 362/108 |
| 5,558,044 A | 9/1996 | Nasser, Jr. et al. | 119/796 |
| 5,762,029 A | 6/1998 | DuBois et al. | 119/796 |
| 5,777,790 A | 7/1998 | Nakajima | 359/536 |
| 5,850,807 A | 12/1998 | Keeler | 119/799 |
| 5,882,796 A | 3/1999 | Wilson et al. | 428/411.1 |
| 5,910,858 A | 6/1999 | Frey et al. | 359/534 |
| 5,926,314 A | 7/1999 | Smith et al. | 359/530 |
| 5,962,108 A | 10/1999 | Nestegard et al. | 428/172 |
| 5,967,095 A | 10/1999 | Greves | 119/795 |
| 6,070,556 A | 6/2000 | Edwards | 119/792 |
| 6,170,968 B1 | 1/2001 | Caswell | 362/469 |
| 6,289,849 B1 | 9/2001 | Macedo et al. | 119/796 |
| 6,557,498 B1 | 5/2003 | Smierciak et al. | 119/858 |
| 2004/0160671 A1* | 8/2004 | Tanaka | 359/515 |

FOREIGN PATENT DOCUMENTS

| | | | |
|---|---|---|---|
| JP | 410108576 A | * | 4/1998 |
| JP | 2003307605 A | * | 10/2003 |

* cited by examiner

OMNIDIRECTIONALLY REFLECTIVE HORSE HALTER

CROSS-REFERENCE TO RELATED APPLICATIONS

This application is a continuation-in-part of U.S. application Ser. No. 10/935,687, filed Sep. 8, 2004, now U.S. Pat. No. 6,925,965, which, in turn, claims the benefit of application Ser. No. 60/591,936, filed Jul. 28, 2004.

BACKGROUND OF THE INVENTION

1. Field of the Invention

The present invention relates to horse halters; and more particularly, to an omnidirectionally reflective horse halter that facilitates location of horses during dusk or nighttime hours to enhance safety of persons in the vicinity of the animal in a paddock, field or ranch.

2. Description of the Prior Art

Walking on a horse ranch during dusk or nighttime hours can be hazardous, since the visibility is poor and the behavior of free roaming horses is unpredictable. Similar risks are associated with riding of horses during dusk or nighttime hours. Use of high intensity illumination is not always possible since a horse ranch covers a wide area. For these reasons, persons tending or riding horses on a ranch usually carry an illuminating light source.

Oftentimes, the illuminating light source carried is ineffective due to its limited illuminating distance. In such situations, poorly illuminated regions in front of the rider or a walker can present a high level of danger. Higher intensity, bright illumination sources do not solve this hazard, since these high intensity light sources tend to frighten or confuse the horse.

Reflective pet leashes are commercially available and reflect headlights of incoming vehicles, thereby warning the driver of the pet activity in the road. Such reflectors are not omnidirectionally reflective and, consequently, require a high intensity bright light source. Several approaches devised by prior art workers attempt to provide solutions for reflecting light from a pet. These approaches include 1) use of pet collars that are illuminated or reflective; 2) use of leashes which are illuminated or reflective; or 3) a combination of both features. None of these solutions have been used for a horse halter, and the aforementioned solutions cannot be readily adapted for use on a horse ranch.

Various types of illuminated dog collars using bulb or other powered sources are known in the art. These power-illuminated leashes require batteries, light bulbs or other lighting elements, which are not needed for reflective illumination.

U.S. Pat. No. 4,173,201 to Chao et al. discloses an illuminated collar for pets and the like. U.S. Pat. No. 4,513,692 to Kuhnsman et al. discloses an illuminated pet leash comprising a non-opaque tube that contains one or more bundles of optical fibers. U.S. Pat. No. 4,895,110 to Lo Cascio discloses a pet collar that includes a light source and a power source attached to a strap. U.S. Pat. No. 4,887,552 to Hayden discloses an electrically lighted pet leash that is composed of a transparent, flexible tube containing a string of small electric light bulbs mounted in parallel between two insulated wires. U.S. Pat. No. 5,046,456 to Heyman et al. discloses an illuminated pet collar in which multiple lights are mounted within a flexible, light-permeable tube that extends about the perimeter of the collar. A housing mounted on one end of the tube contains a circuit and a battery for operating the lights. U.S. Pat. No. 5,140,946 to Pennock et al. discloses an illuminated pet collar with miniature lights powered by a battery encased within a flexible, pliable, transparent plastic display tube, which are parallel-wired within the display tube. U.S. Pat. No. 5,370,082, to Wade discloses an animal collar that includes illuminating devices, such as light emitting diodes, liquid quartz strips or electric lamps powered by a plurality of solar cells. U.S. Pat. No. 5,429,075 to Passarella et al. discloses a pet leash and flashlight combination. U.S. Pat. No. 5,523,927 to Gokey discloses an illuminated animal collar light emitting diode placed on the outer exterior of a collar powered by a battery. U.S. Pat. No. 5,535,106, issued to Tangen, discloses a lighted animal collar that includes a plurality of separate light emitting assemblies, or housings, at spaced intervals along the collar. U.S. Pat. No. 5,558,044 to Nasser, Jr. et al. discloses an illuminating leash handle with a flashlight. U.S. Pat. No. 5,630,382 to Barbera et al. discloses an illuminated pet harness having straps with internal cavities that contain fiber optic cores illuminated by a light bulb. U.S. Pat. No. 5,762,029 to DuBois et al. discloses a combined retractable leash and flashlight. U.S. Pat. No. 5,850,807 to Keeler discloses an illuminated pet leash, wherein illumination is remotely activated by a pet owner to locate the leash. U.S. Pat. No. 5,967,095 to Greves discloses an electroluminescence-illuminated pet flat leash strap. U.S. Pat. No. 6,170,968 to Caswell discloses a motion activated rotatable illuminator. U.S. Pat. No. 6,289,849 to Macedo et al. discloses a device for removably attaching a flashlight to a retractable dog leash. U.S. Pat. No. 6,557,498 to Smierciak et al. discloses a night safety pet illumination marker, with a pet collar having a series of light emitting diodes mounted around the perimeter of the collar and powered by battery power. None of these prior art workers discloses use of reflective material on a horse halter.

Various types of dog collars illuminated by reflection are known in the art. Representative dog collars of this variety are discussed below.

U.S. Pat. No. 3,871,336 to Bergman discloses a reflective dog collar which is not illuminated; but which utilizes a highly reflective material having the form of different color dots encapsulated in plastic. This illuminates only portions of the flat planar pet collar.

U.S. Pat. No. 3,999,521 to Puiello discloses a reflective safety harness for quadruped animals. The harness includes a pair of identical sheet elements with a light reflective surface mounted on opposite sides of the animal. At the corners of the sheet are fastened straps, which circumscribe the animal's body at the front and rear of the harness. Extending from the front strap, at the top point thereof, midway between the two elements, is a loop through which the dog's regular collar is passed. The arrangement assures immovable attachment of the harness on the dog's body. The disclosure by the '521 patent of a reflective sheet positioned on both sides of the animal does not suggest a horse halter that reflects incident light.

U.S. Pat. No. 4,167,156 to Kupperman et al. discloses a reflective animal leather leash. The leash includes a sewn a transparent polyvinyl chloride strip with a light reflective prism design on one surface. The light reflective prism is bonded by dielectric heat sealing or sonic welding to an opaque polyvinyl chloride strip sewn to the leather strip, resulting in a leash having a light reflective surface. Since the strip has a reflective surface on only one side of the leash, it does not reflect light in every direction. The flat leather leash is not easily twistable and is not readily bent without separating the transparent and opaque polyvinyl chloride layers.

U.S. Pat. No. 4,384,548 to Cohn discloses a safety device for animals. A pet collar uses "retro-reflective" threads with glass reflective elements in a flexible webbing to form a pet leash. The threads are said to reflect incident light directly back toward the source. Disposition of reflective threads in the webbing forming the collar is sparce. As a result, the quantum of incident light reflected is small; and an insignificant quantum of incident light is reflected back to the source.

U.S. Pat. No. 4,407,233 to Bozzaco discloses a safety collar for pets. The collar has highly reflective flexible elements with a length large enough to extend beyond the outer surface of the pet's hair. Flexible elements containing Scotchlite reflecting strips are attached to a collar. A reflective horse halter is not disclosed, and the flexible elements do not reflect light in every direction.

U.S. Pat. No. 5,243,457 to Spencer discloses a material with enhanced visibility characteristics. This flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. Bonded, i.e. by heat-sealing, to the first layer is a second layer of plastic luminescent material. The second layer is contiguously and integrally attached to the underlying surface of the prism-like formations and generally coextensive therewith. The visibility enhancing material simultaneously radiates luminescent light from the second layer through the underlying surface of prism-like formations and through the smooth light transmissive surface, and reflects light from the prism-like formations through the smooth light transmissive surface. In one embodiment, a leash for controlling and restraining a pet animal includes a flexible elongate member comprised of the visibility enhanced material. In another embodiment, the second layer is replaced with a layer of luminescent material, which can be selectively energized to become luminous. Since the transparent reflective material is a molded plastic having a prismatic construction, it is rigid and inflexible; and cannot form a horse halter that is capable of being twisted and bent. Moreover, any twisting and bending action tends to separate the reflective element from the luminescent element.

U.S. Pat. No. 5,237,448 to Spencer et al. discloses a visibility enhancing material. The flexible visibility enhancing material combines the advantages of a light reflective component and a luminescent component. The material includes a first layer of prismatic light reflective plastic material having an underlying surface formed with a plurality of minute prism-like formations projecting therefrom at regular spaced intervals, and an overlying substantially smooth light transmissive surface. A second layer of plastic luminescent material is contiguously and integrally attached to the underlying surface of the prism-like formations and generally coextensive therewith. The visibility enhancing material simultaneously radiates luminescent light from the second layer through the underlying surface of the prism-like formations and through the smooth light transmissive surface, and reflects light from the prism-like formations through the smooth light transmissive surface. In one embodiment, a leash for controlling and restraining a pet animal includes a flexible elongate member comprised of the visibility enhanced material. Since the transparent reflective material is a molded plastic of prismatic construction, it is rigid and inflexible; and cannot form a horse reins or horse harness that is capable of being twisted and bent. Furthermore, any twisting and bending action will result in separation of the reflective element from the luminescent element.

U.S. Pat. No. 6,070,556 to Edwards discloses an illuminating dog safety system. This illuminating dog safety system is designed for allowing an animal to be more visible at night. The device includes a collar that is worn around a neck of an animal. A reflective strip extends for a majority of the collar's length. A harness is provided that is adapted to be worn around a torso of the animal. The harness is comprised of an upper strap member, a lower strap member, and a longitudinal extension therebetween. Each of the upper strap member, the lower strap member, and the longitudinal extension has a reflective strip extending for a majority of its length. A leash is adapted for securement to the collar. The leash has a reflective strip extending for a majority of its length. Each of these strip elements is flat, as shown in FIG. 3 of the patent disclosure. Twisting the elements does not provide the reflectivity needed for adequate visibility at night.

Numerous patents disclose reflective materials. Some of these patents disclose reflective elements having corner cube shapes embedded in rigid or flexible polymeric strips and monolayers of spherical beads, i.e. primarily glass beads bonded to a reflective sheet.

U.S. Pat. No. 3,176,584 to DeVries et al. discloses that a reinforcing layer may be incorporated into an embedded lens retroreflective sheeting. The reinforcing layer may comprise a composition similar to the binder in which the microspheres are embedded. The layer may be applied to the back side of the secularly reflective layer via spraying, i.e., by a solvent-coating technique. Examples of the reinforcing layer materials disclosed include methyl methacrylate, flexible epoxy resins, chloro-sulfonated polyethylene, polystyrene, polypropylene, polycarbonate resin, ethyl cellulose, and cellulose acetate-butyrate. The reflective layer is typically very thin and fragile, i.e. in the order of 0.06 microns thick, and must be disposed in special relationship to the microspheres in order for the sheeting to provide useful retroreflection.

U.S. Pat. No. 3,190,178 to McKenzie discloses a reflex reflective sheeting. It uses a monolayer of microspheres embedded in a polymer to reflect the incoming light beam in the same direction as the incident beam. Since the sheet is formed by melting of the polymeric binder, it is rigid and therefore unsuitable for a horse halter.

U.S. Pat. No. 4,025,159 to McGrath discloses cellular retroreflective sheeting. The cellular retroreflective sheeting comprises a base layer of retroreflective elements and a transparent cover film supported in spaced relation away from the base layer by a network of narrow intersecting bonds. These bonds form hermetically sealed cells within which retroreflective elements are isolated from retroreflective elements of different cells. The resultant sheeting achieves greater durability through use of bonds that are cured in situ after they have been thermoformed into sealing contact between the cover film and base layer. The base material is coated with the binder, and subjected to heat and pressure to displace the binder around the embedded microsphers or corner cubes forming the bonded network. Retroreflective articles so constructed tend to be rigid and inflexible.

U.S. Pat. No. 4,576,850 to Martens, and U.S. Pat. Nos. 4,582,885 and 4,668,558 to Barber disclose shaped plastic articles having replicated microstructure surfaces. A shaped plastic article is made from a crosslinked polymer having hard and soft segments that contain a microstructure-bearing surface, which is replicated with a castable fluid and radiation hardened. Articles formed by this process exhibit, a retro-reflective cube-corner sheeting, Fresnel lens or video disc. All these formed articles are rigid and therefore unsuitable for use in a horse halter. Moreover, these articles also exhibit low tear strength.

U.S. Pat. No. 4,763,985 to Bingham discloses a launderable retroreflective appliqué that comprises a layer of transparent microspheres, a specular reflective layer optically connected to each microsphere, and a binder layer into which the microspheres are partially embedded. Resins disclosed as being suitable for use as binder layers include polyurethane, polyesters, polyvinyl acetate, polyvinyl chloride, acrylics, or combinations thereof. The specular reflective layers are composed of two succeeding layers of dielectric material. The layers have varying refractive indices and are composed of a variety of binary metal compounds including oxides, sulfides, and fluorides.

U.S. Pat. No. 4,815,818 to Thomas discloses three-dimensional flexible reflectors. Each reflector is provided with an elastomeric resilient member having a plurality of embedded retro-reflective glass beads. A portion of the outer surface of the elastomeric material is removed to expose the glass beads. The exterior surfaces of the glass beads have their outer surfaces exposed and are subject to abrasion.

U.S. Pat. No. 4,950,525 to Bailey discloses elastomeric retroreflective sheeting. The elastomeric retroreflective sheeting has a monolayer of non-stretchable microspheres. These microspheres are embedded in a sheet with a spacing layer of transparent elestomeric material underlying the back surface of the microspheres. A cover layer of transparent elastomeric material covers the front surface of the microspheres. A specularly reflective layer is disposed on the back surface of the spacing layer. The cover layer comprises a clear thermoplastic elastomeric aliphatic polyurethane.

U.S. Pat. No. 4,957,335 to Kuney discloses microsphere-based retro-reflective articles having high retroreflective brightness at narrow divergence or observation angles, i.e. up to 0.5 degrees. The article is made by selection of microspheres having defined combinations of average diameter and average refractive index. This patent teaches (column 4, lines 18–23) that variation in the size of the microspheres will increase the observation angle or divergence angle of the resultant retro-reflective article.

U.S. Pat. No. 5,066,098 to Kult et al. discloses cellular encapsulated-lens high whiteness retroreflective sheeting with a flexible cover sheet. This cellular, encapsulated-lens retroreflective sheeting comprises a base sheet of a monolayer of retroreflective elements that are partially embedded in a binder layer, which typically is white. A cover sheet is disposed in spaced relation from the layer of retroreflective elements. A network of narrow intersecting bonds, or seal legs, that extend between the cover sheet and the base sheet with binder material are thermoformed at the point of contact between the base sheet and cover sheet. Such a rigid, reflective sheet is unsuitable for a horse halter, which requires structures that can twist and flex.

U.S. Pat. No. 5,117,304 to Huang et al. discloses a retroreflective article. The retroreflective article has corner cubes and is flexible, and can be applied over irregular surfaces by using an optically clear, aliphatic polyurethane polymer. The aliphatic polymer has a plurality of hard chain segments having the formula —C(O)N(H)—$C_6H_{10}$—N(H)C(O)—.

U.S. Pat. No. 5,200,262 to Li discloses a launderable retroreflective appliqué. The appliqué employs a reflector that comprises elemental aluminum or elemental silver on the backside of the microspheres. The appliqué comprises a monolayer of metal-coated microspheres partially embedded in and partially protruding from a binder layer. The binder layer comprises a flexible polymer having hydrogen functionalities and one or more isocyanate-functional silane coupling agents. The disclosed flexible polymers that possess hydrogen functionalities are crosslinked, flexible urethane-based polymers, such as isocyanate-cured polymers or one or two component polyurethanes and polyols.

U.S. Pat. No. 5,283,101 to Li discloses a launderable retroreflective appliqué comprising a binder layer formed from an electron-beam curable polymer and typically one or more crosslinkers and silane coupling agents. Electron-beam curable polymers include chlorosulfonated polyethylenes, ethylene copolymers comprising at least about 70 weight percent of polyethylene, such as ethylene/vinyl acetate, ethylene/acrylate, and ethylene/acrylic acid, and poly(ethylene-co-propylene-co-diene) polymers. Glass microspheres are embedded in the cured binder layer, and a specular reflective metal layer is disposed on the embedded portions thereof. When the appliqué is inverted, light comes through the binder layer.

U.S. Pat. No. 5,777,790 to Nakajima discloses a microsphere-based retroreflective article. The retroreflective article comprises a monolayer of microspheres partially embedded in and protruding from a binder layer and specular reflector underlying the microspheres. The monolayer of microspheres comprises a mixture of a first class of microspheres having a first refractive index and a second class of microspheres having a second refractive index. The second refractive index is higher than the first refractive index. As a result, the sheeting exhibits superior observation angle angularity.

U.S. Pat. No. 5,882,796 to Wilson et al. discloses bonded structured retroreflective sheeting. The structured retroreflective sheeting includes an array of corner cube structured retroreflective elements, a thermoplastic sealing film located proximate the structured elements, and bonding agent between the sealing film and the structured retroreflective elements. The bonding agent bonds the sealing film to the structured retroreflective film. This bonded structure is rigid and is unlikely to survive the flexing and twisting movements of a horse halter.

U.S. Pat. No. 5,926,314 to Smith et al. discloses a retroreflective cube corner article having scalene base triangles. The cube corner retroreflective article exhibits a wide range of retroreflective entrance angularity in at least one plane, and preferably in two or more planes. The structured surface has an array of cube corner elements formed by three intersecting sets of substantially parallel grooves. Each cube corner element includes a base triangle bonded by one groove from each of the three intersecting groove sets, the base triangle being scalene. The corner cube reflector is rigid and cannot be used for producing a reflective horse halter.

U.S. Pat. No. 5,962,108 to Nestegard et al. discloses a retroreflective polymer coated flexible fabric material and method of manufacture. The retroreflective polymeric coated flexible fabric material has a retroreflective layer and a polymeric compatibilizing layer welded to a polymeric coated outer surface of a flexible fabric material. The compatibilizing layer provides an intermediate layer between the retroreflective layer and the flexible fabric material, creating suitable bond strength between dissimilar polymers. Flexible fabric materials are polyester, nylon or cotton. The fabric is coated with highly plasticized polyvinyl chloride (PVC) or ethylene acrylic acid copolymer (EAA). These polymers are flexible, durable, and resistant to abrasion. The retroreflective prismatic elements layer includes: acrylic polymers, such as poly(methylmethacrylate); polycarbonates; cellulosics; polyesters such as poly(butyleneterephthalate); poly(ethyleneterephthalate); fluoropolymers; polyamides; polyetherketones; poly(etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. The compatibilizing layer that is suitable for bonding between a retroreflective layer and a flexible fabric material include: polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Such a reflective fabric does not suggest the shape, construction or function of a horse halter.

U.S. Pat. No. 5,910,858 to Frey discloses retroreflective sheeting with a coated back surface. The retroreflective sheet has a plurality of indentations on the back surface to reflect the light, and a transparent front surface to encapsulate and protect the light reflecting indentations. This reflective sheet is rigid and is unsuitable for use in a horse halter.

A number of patents disclose bridal bit and horse reins constructions and horse harnesses. There are no disclosures that relate to omnidirectionally reflective horse halters. For example, U.S. Pat. No. 962,134 to Washington J. Engle, discloses a bit. U.S. Pat. No. 3,205,636 to William D. Laningham, discloses a horse mouth bit. U.S. Pat. No. 5,29,472 to Melvin F. Bigelow, discloses a bridle bit. U.S. Pat. No. 6,834,482 to Collins, III discloses a swivel cheeked bridle bit. U.S. Pat. No. 6,848,242 to Chang, et al. discloses a pivoted equestrian bit with a stop system.

Notwithstanding the efforts of prior art workers to construct animal leashes and the like that are illuminated by incident light, there remains a need in the art for a flexible abrasion resistant horse halter that omnidirectionally reflects a significant quantum of incoming light back to its source. Numerous methods for producing retroreflectors have been disclosed in the prior art. A flexible horse halter having a robust construction that withstands tensile and torsional forces attending halter usage has long been needed in the art. Also needed is a flexible, omnidirectional abrasion resistant horse halter capable of maintaining high reflectivity even with low power illumination sources of the type used by walkers and horse riders during dusk or nighttime hours.

SUMMARY OF THE INVENTION

The present invention provides a horse halter that is abrasion resistant and omnidirectionally reflective. Omnidirectional reflectivity is provided by the incorporation of retroreflective corner cube reflectors or microsphere reflective elements. With this structure, the halter reflects back to the source a significant quantum of the incident light even from a weak illumination source from persons walking or riding in a paddock or field during dusk or nighttime hours. This omnidirectional reflectance of the halter is achieved by: a) creating a flexible retroreflective sheet comprising a plurality of corner cube reflectors bonded via a transparent bond to a flexible polymeric sheet, or several microspheres bonded via a transparent bond to a reflectorized flexible polymeric sheet; b) producing a narrow width strip composed of nylon or polypropylene fibers by knitting, weaving or braiding, to achieve a strip width in the range of 0.0065 inch to 0.25 inch, depending upon the size of the central cylindrical rope core; c) thermally bonding the flexible retroreflective sheet to the narrow width strip to form a narrow width reflective strip; d) cylindrically braiding, at a shallow braid angle, three or more narrow width reflective strips to surround and cover the external surface of a central cylindrical halter core made from braided nylon or polypropylene fibers; and e) forming a cylindrical retroreflective braided sleeve integrally surrounding a central cylindrical halter core to thereby create a horse halter having an external retroreflector surface.

In addition, the invention provides a horse lead having the aforementioned braided construction and omnidirectional reflectivity. The proximal end of the lead is, optionally, formed into a loop that defines a tether handle. Preferably, the lead does not comprise a handle; but has a proximal end comprised of a straight, non-handled terminus. For those leads that contain a handle, the retroreflective cylindrical braiding sleeve present on the handle is seamlessly braided, closing the loop. Thus the handle also reflects the incident light from the light source carried by a walker or another rider back to the source, illuminating the position of the hand that is holding the halter. The distal end of the lead is attached to mechanical hardware, such as a metallic ring, or a spring-loaded clip, which attaches to a horse harness provided with a bridle bit or to a halter. Preferably the distal end of the lead is equipped with a spring-loaded clip adapted to detachably engage the harness or halter in the conventional way. A transparent abrasion resistant coating may be applied to the entire length of the lead to protect the reflective coating.

In a second embodiment, a halter may be fabricated without a bridal bit by a series of individually connected elements that are fashioned to provide a completely reflective halter. This halter is commonly used when the horse is freely roaming in the horse ranch. This halter with individually connected elements has several straight section elements that are connected to adjustable buckles adapted for positioning the halter around the head of a horse using metallic ring hardware or spring loaded clips. The halter may be provided with one or more breakaway links so that if the halter is caught accidentally in a tree branch, the halter releases, allowing the horse to be unrestrained. Alternatively, or in addition to the break away links, the halter includes a crown composed of leather, which extends over the head of the animal and forms a continuous strip connecting each of the break away links. The straight section elements of the halter, between the buckled elements, are made omnidirectionally reflective. A transparent abrasion resistant coating may be applied to the omnidirectional reflectors of the horse halter protecting reflectors from damage.

In a third embodiment, only the straight section element at the muzzle portion of the halter, commonly known as the noseband, is reflectorized by the omnidirectional reflectors. The omnidirectional reflectors may additionally form a chinstrap, which extends under the chin of the animal. The omnidirectional reflectorized noseband and chinstrap sections of the halter collectively extend around the nose of the animal, thereby reflecting a maximum amount of light back to the illuminating source.

In a fourth embodiment, all sections of the halter except the crown section, which extends over the top of the horse's head, are reflectorized by the omnidirectional reflectors. The crown section is composed of leather, and is adapted to break if the horse halter becomes entrapped by a branch or limb of a tree, or the like. The omnidirectional reflectors of which the remaining sections are comprised reflect light back to the illuminating source to provide for high visibility of the horse in dimly lit environments.

The cylindrical character of the flexible cylindrical braided sleeve reflects a significant quantum of incident light back to the source effectively since some portion of the braided sleeve is always at angles close to normality and most of the braided cylindrical sleeve falls within the reflecting angular range of the retroreflectors. The shallow braiding angle of the cylindrical braid sleeve lays the thermally bonded narrow width strips at a shallow angle with respect to the length of the cylindrical central core. As a result the horse reins or horse harness can be readily flexed or twisted due to the relative movement provided within the cylindrical braid sleeve structure.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

The present invention provides an abrasion resistant harness that is flexible, twistable and omnidirectionally reflective. Generally stated, the harness has a pair of reins proceeding to the proximal end thereof, which is also omnidirectionally reflective. The distal end of the horse harness has a ring or a spring loaded clasp that is integrally braided into the harness, forming an attachment mechanism to the ring attached to a mouth bar, which carries a bridal bit. Both the harness and its handle are omnidirectionally reflective, reflecting incident light back to its source, thereby clearly defining the horse rider's hand and the location of the horse reins, when illuminated by a light carried by a walker or another horseback rider. This increases the margin of safety in dusk or nighttime environments, since a light carried by a walker or a second horseback rider tends to illuminate the horse rider's hand and the horse reins, thereby reducing the possibility of accidents. Since the omnidirectionally reflecting horse harness reflects light over a broad range, due to its reflective cylindrical sleeve arrangement, light incident at a significant angle is still reflected back.

In a second embodiment, a horse halter is provided without a bridle bit; but with omnidirectionally reflective elements placed between adjustable buckles. Metallic rings or spring loaded clasps are used as connective elements between the omnidirectionally reflective elements and adjustable buckles. This omnidirectionally reflective horse halter is used when the horse is allowed to freely roam in a paddock or field. One of the adjustable buckles is designed as a breakaway link, which releases the horse when the halter is accidentally caught in a tree branch. The omnidirectionally reflective horse halter reflects the incident light from a light source carried by a walker or a second horse rider during dusk or nighttime hours. The low intensity light source carried by the walker does not alarm the horse, and the walker or second horse rider safely avoids unexpected encounters with a roaming horse, decreasing or eliminating the possibilities of accidents.

The abrasion resistant omnidirectional harness, or elements of an omnidirectionally reflective horse halter are constructed by building a cylindrically reflective sleeve from narrow width strips of nylon or polypropylene. These narrow width strips are thermally bonded to a polymeric flexible sheet with a plurality of retroreflecting elements. The retroreflecting elements may be corner cubes, in which case the polymeric flexible sheet can be non-reflective. Alternatively, the retroreflecting elements may be microspheres. If microspheres are used as retroreflective elements, the polymeric flexible sheet needs to be reflective and is typically metallized with aluminum or silver. In either case, the retroreflective elements are bonded to the flexible sheet using a transparent binder.

The flexible sheet with retroreflective elements is available from 3M Company under the trade name SCOTCHLITE. Such flexible polymer is typically PVC. It is available in a variety of sizes. This flexible reflectorized sheet is thermally bonded to a braided, woven or knitted narrow width nylon or polypropylene strip. The strip may have a width of 0.0065 inches to 0.25 inches and is thermally bonded to a SCOTCHLITE strip having a similar width. The thermal bonding binder may be selected from a number of polymeric binders including, but not limited to, polyvinyl chloride, polyethylene, polyurethane, polyvinyl acetate or acrylates. The bonded narrow width strip is highly flexible and can be cylindrically braided, surrounding a central rope core of the harness or halter, which substantially sustains applied tensile forces.

The cylindrical braiding employs three or more thermally bonded narrow width strips with flexible reflective strips. The cylindrical braiding is accomplished with a small angle between narrow width strips and the longitudinal direction of the central core rope. The proximal end of the central core of the harness or halter is, optionally, fashioned to form a loop representing a handle. The distal end is formed to go through a metallic loop to create an attachment for a bridal bit or to other sections of a horse harness. The cylindrical braiding covers the entire length of the harness, including the handle, if present, and the metallic hardware. The ends of the braid are terminated by permanent bonding.

In a third embodiment, only the muzzle of the horse harness, as described in the second embodiment, is coated with omnidirectionally reflective elements. This muzzle section of the harness is relatively straight and the omnidirectionally reflective elements reflect light efficiently.

In a fourth embodiment, the horse harness is provided with at least one omnidirectionally reflective section, which reflects light back to the source, and the bridle bit is removed, thereby providing a halter. The crown section of the halter is constructed of leather, which can tear when the horse becomes entrapped by the branch or limb of a tree. This halter is suitable for application to a horse that is freely roaming within a paddock or field (for example, on a horse ranch). The reflective section is preferably attached to at least one break-away buckle located aside the horse's head. The leather section, comprising the crown, spans the distance above the horse's head and immediately behind the animal's ears. Adjusting buckles to which the leather section is attached are constructed from metallic rings or spring-loaded clasps. The adjustment of the buckles is made to secure the harness snugly around the head of a horse. One of the metallic rings is fashioned to be a breakaway link. With this construction, a horse harness or halter that is accidentally caught in a tree limb or other restraining object "breaks away", thereby enabling the horse to readily free himself from the restraining object. The omnidirectionally reflective elements, which preferably constitute each section of the halter except for the crown, may be coated with an abrasion resistance coating to prevent damage to the reflecting elements.

In yet another embodiment, the invention provides a horse lead having the braided construction and omnidirectional reflectivity discussed hereinabove.

Figure 1A:
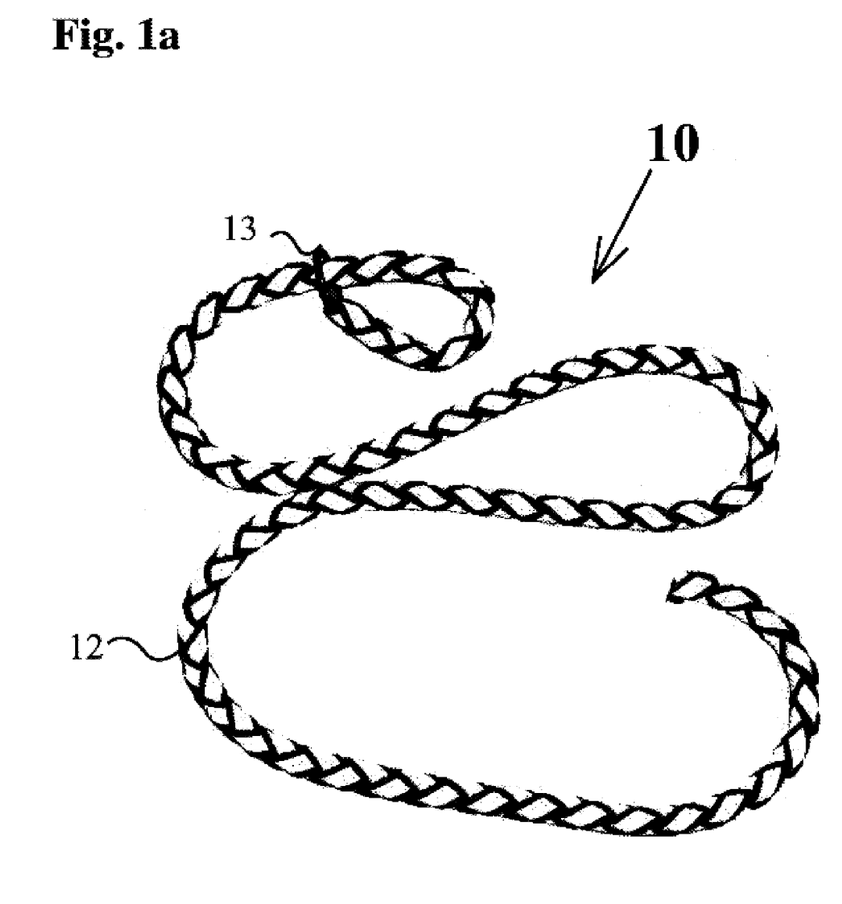
FIG. 1a is a photograph of a horse lead showing a reflective cylindrical braided sleeve of narrow width strips covering a central core, lead central section, and metallic ring, taken with camera flash light showing reflective portions as bright regions.

FIG. 1a is a photograph of a tether, or lead 10 showing the central lead section 12, and the metallic ring distal section 13. A cylindrically braided sleeve, created from braided narrow width reflective strips, covers each of these sections (12 and 13), providing substantially the entire surface of the tether with omnidirectional reflectivity. The horse lead completely reflects incident light in the same direction the light was emanated. Due to the cylindrical character of the reflective braided sleeve, some portion of the sleeve is always at normal orientation to the incoming light beam, that is, the quantum of light reflected from the retroreflective elements is maximized. Retroreflective elements reflect light over a large range of acceptance angles, but the reflection is at a lower intensity. This cylindrical construction effectively reflects the incoming camera flash light as shown in the photograph of FIG. 1a by the extremely bright appearance of the retroreflectors 16 (see also FIG. 2) of the horse lead.

Figure 1B:
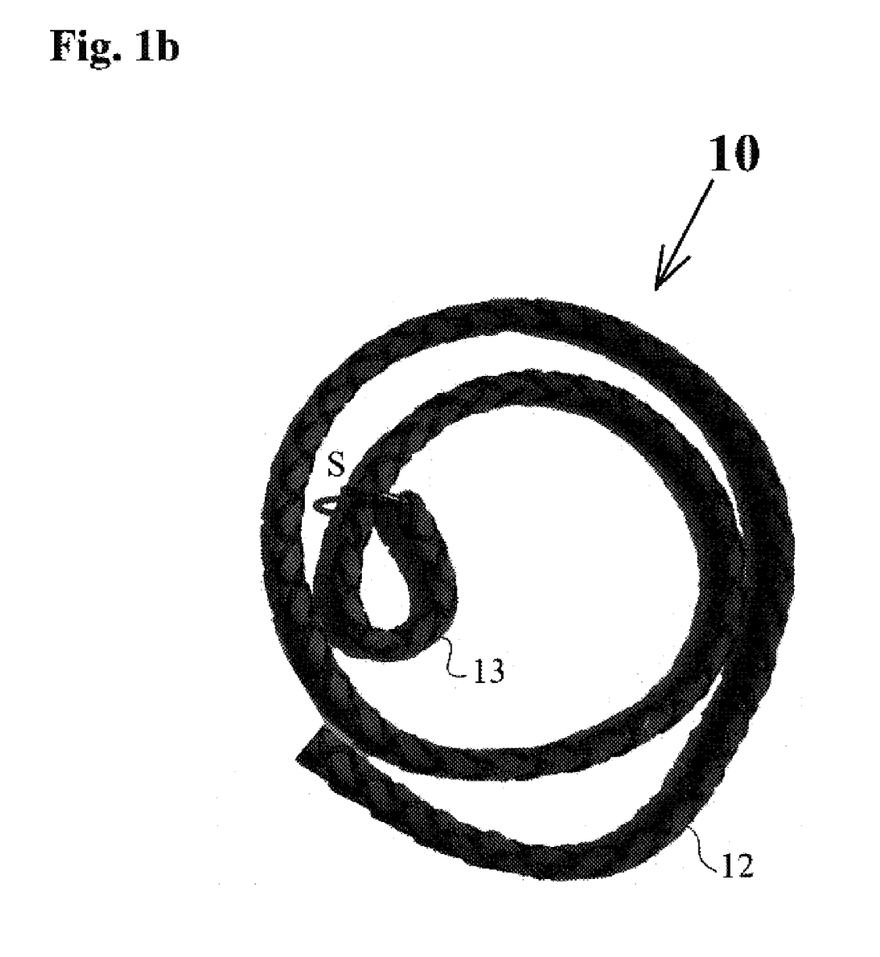
FIG. 1b is a photograph of the horse lead showing a lead with the cylindrical reflective braided sleeve of narrow width strips covering a central core forming a lead central section and metallic ring, taken without camera flash light showing reflective portions as dark regions.

FIG. 1b shows a photograph of another view of the omnidirectional reflective horse lead without using a camera flash. The illumination comes from the room's light, as evidenced by the shadow, "S", of the metallic ring in FIG. 1b. The light here, again, is reflected back to the illuminating source, and practically no light is directed in the direction of the camera. As a result, the retroreflector bright areas of FIG. 1a now appear dark.

Figure 2:
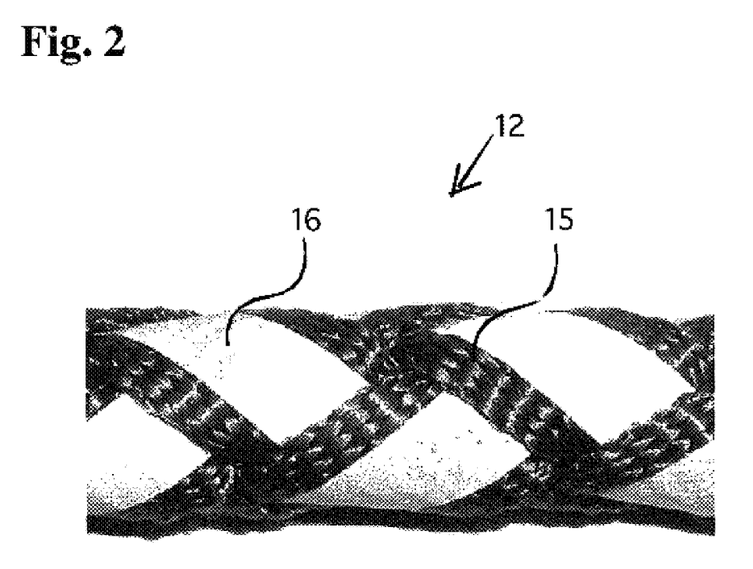
FIG. 2 is a photograph of a section of a horse halter illustrating the reflective cylindrical braided sleeve of narrow width strips surrounding a central horse halter or horse harness core.

FIG. 2 is a photograph of a magnified portion of the central horse lead section 12. The photograph shows the cylindrical reflective braided sleeve with a small braid angle of 5 to 10 degrees between the narrow width strips and the central cylindrical rope core of the horse lead. The central cylindrical rope core is completely covered by the cylindrical reflective braided sleeve and therefore is invisible in the photograph. The flexible retroreflective sheet is shown at 16 and the narrow width strip is shown at 15. The flexible retroreflective sheet 16 is thermally bonded to the narrow width strip 15 prior to the cylindrical braiding operation.

Figure 3:
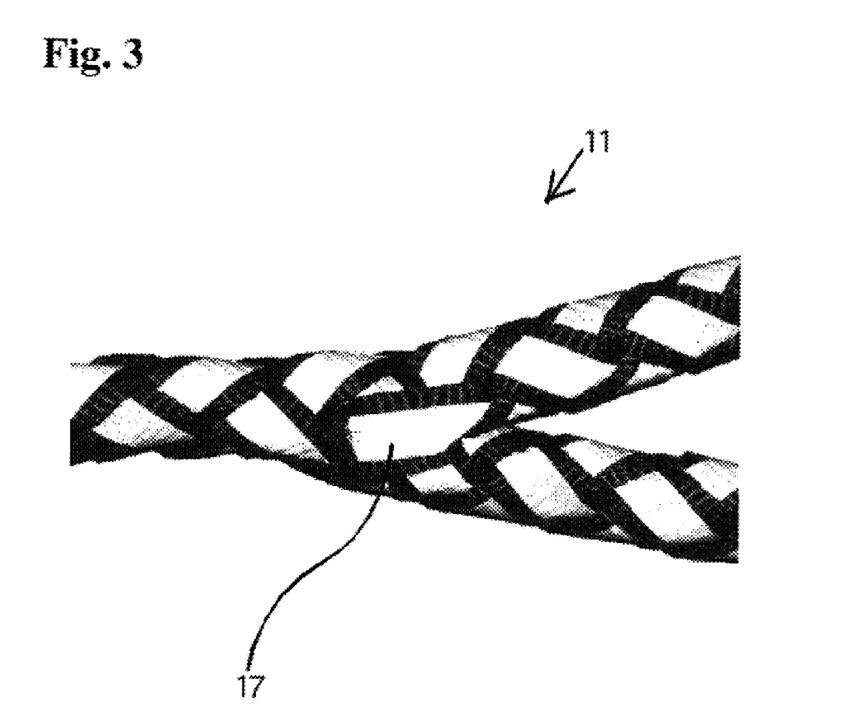
FIG. 3 is a photograph of the proximal end of the horse lead forming a loop that when optionally present functions as a light reflecting handle with reflective cylindrical braided sleeve of narrow width strips.

FIG. 3 shows the details of the handle portion 11, which is an optional component of the omnidirectionally reflective tether. The loop of the central cylindrical braided rope core is completely covered by the cylindrical reflective braided sleeve and the ends of the braid are terminated by bonding to each strip at 17.

Figure 4:
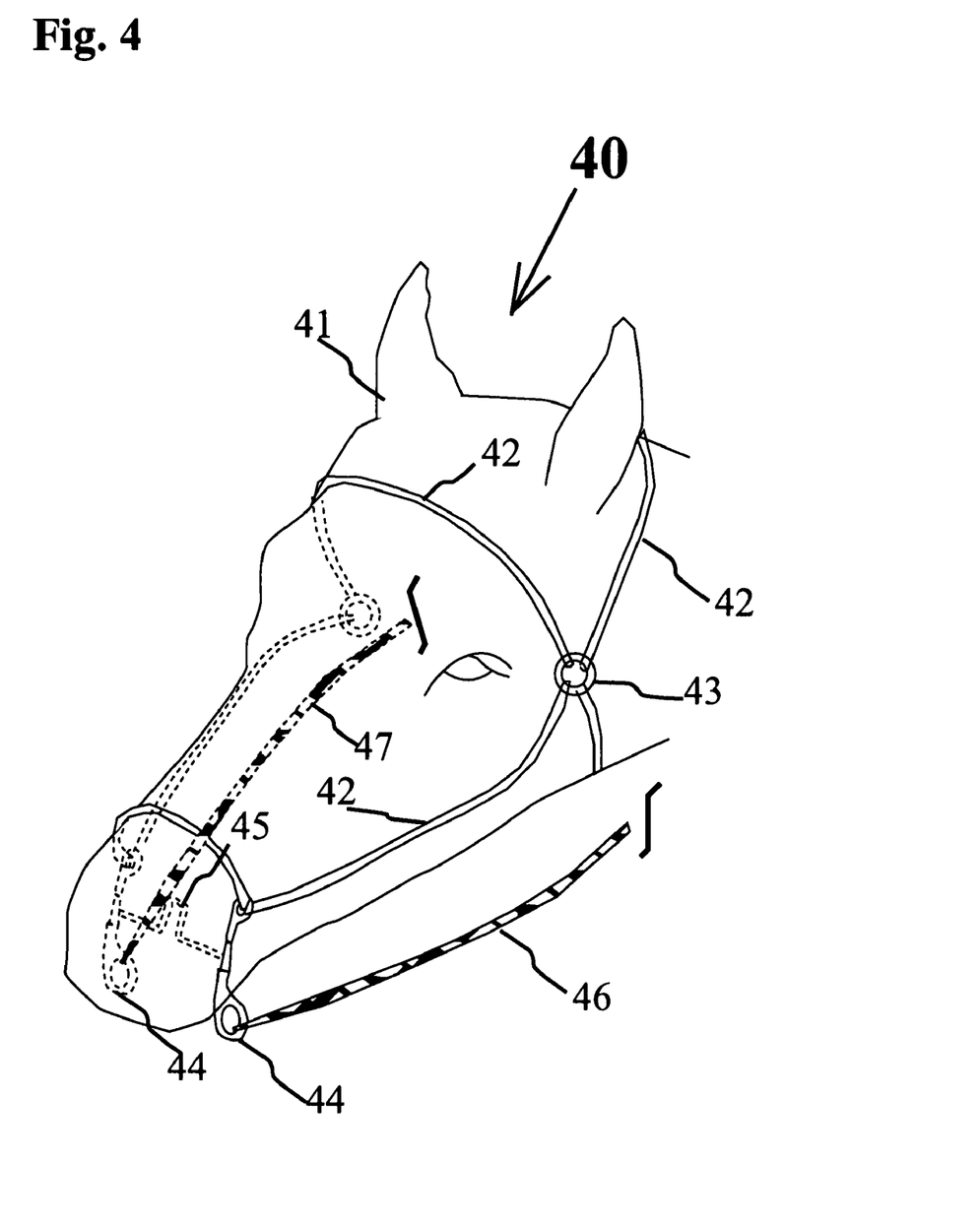
FIG. 4 is a schematic diagram of a horse lead, which is omnidirectionally reflective.

FIG. 4 shows a schematic diagram of a horse fitted with a bridal bit horse harness at 40. The horse reins are made omnidirectionally reflective. A horse 41 is fitted with a bridal bit 45 attached to a horse harness 42 which surrounds the head of the horse, keeping the bit within the animal's mouth. A metallic ring 43, or throatlatch, attaches to the check strap and crown sections 42 of the horse harness providing adjustment capability. The bridal bit is attached to rein rings 44 and the omnidirectionally reflective horse reins 46 are attached to the rein rings. The other ends of the omnidirectionally reflective horse reins are connected behind the neck of the horse.

Figure 5:
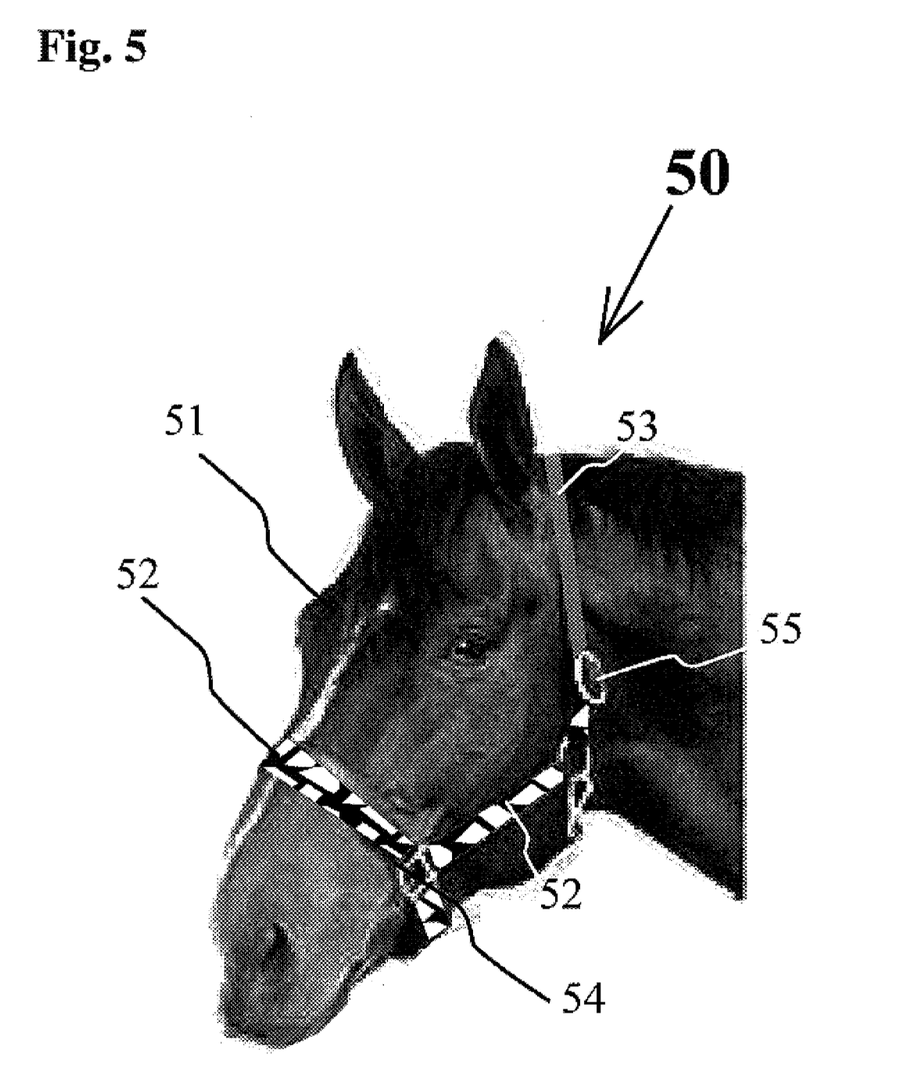
FIG. 5 is a schematic diagram of a horse fitted with an omnidirectionally reflective horse harness.

FIG. 5 shows a schematic diagram of the second embodiment showing a horse 51, fitted with a horse halter 50 without a bridal bit. This halter is usually used when the horse is free to roam in a paddock or field. The horse halter has sections 52, including a cheek strap piece, a chinstrap, and a noseband, which are omnidirectionally reflective and are attached to each other with a breakaway link 54 and adjustable connectors 55. The breakaway link releases the horse when the harness is accidentally caught in a tree limb or branch.

Figure 6:
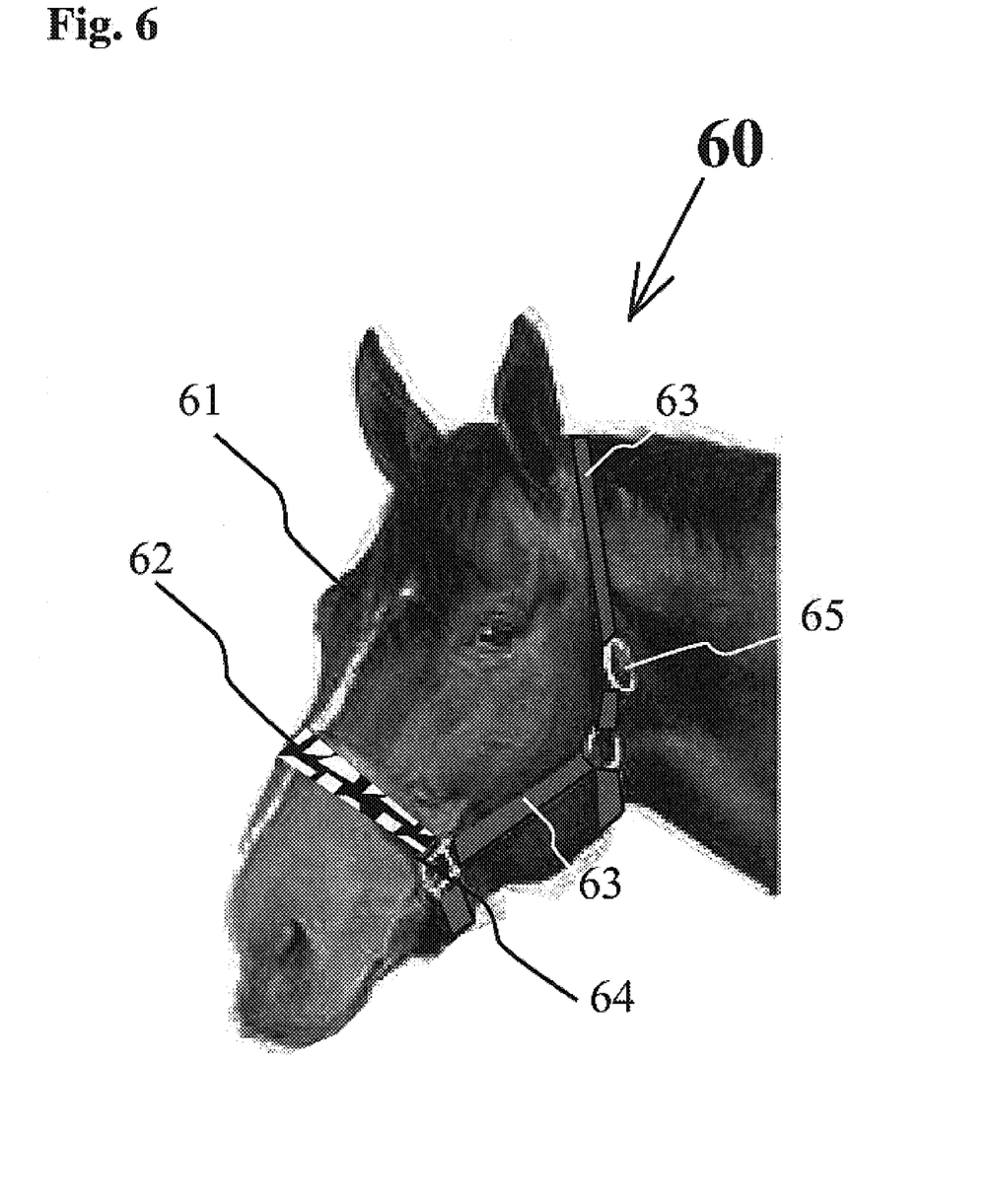
FIG. 6 is a schematic diagram of a horse fitted with a horse harness, the omnidirectionally reflective material being located only at the muzzle portion of the harness and the harness crown being comprised of a leather strap.

FIG. 6 shows a schematic diagram of the third embodiment. A horse 61 is fitted with a horse halter 60 without a bridal bit. This halter is usually used when the horse is free to roam in the horse ranch. The arrangement is similar to that described in FIG. 5 except that the omnidirectionally reflective element comprises the nose band section 62 of the horse harness located at the muzzle. The other sections of the harness, including crown 63, are not omnidirectionally reflective. The breakaway link 64 connected to nose band 72 and the attachment link 65 connected to crown 63 are adapted to release the horse when the halter is accidentally caught in a tree limb or branch.

Figure 7:
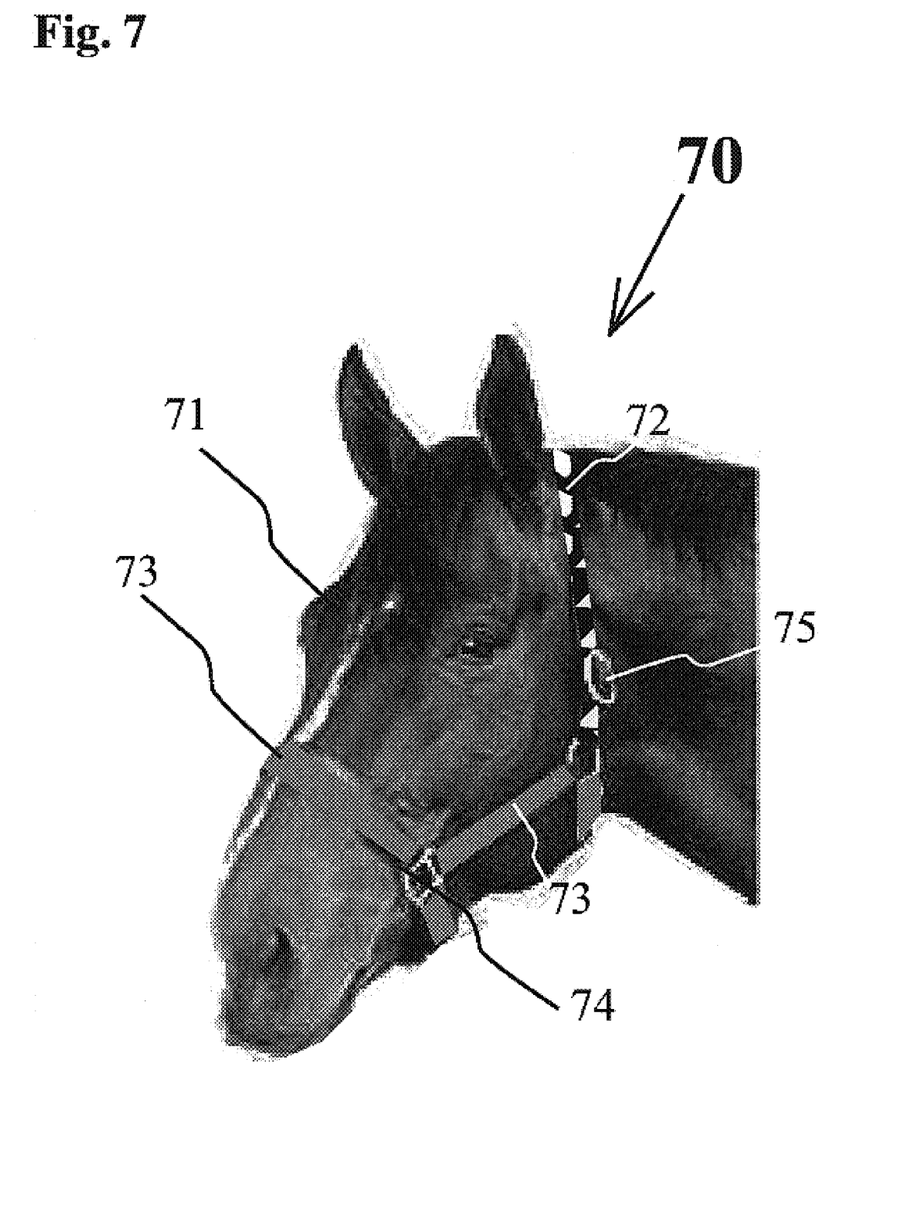
FIG. 7 is a schematic diagram of a horse fitted with a horse harness, the omnidirectionally reflective material being located only at the crown portion of the horse.

FIG. 7 shows a schematic diagram of the fourth embodiment. A horse 71 is fitted with a horse halter 70 without a bridal bit. This halter is usually used when the horse is free to roam in the horse ranch. The arrangement is similar to that described in FIG. 5 except that the omnidirectionally reflective element is crown 72 located above the neck of the horse. The other sections of the harness 73 are not omnidirectionally reflective. The breakaway link 74 connected to nose band 73 and the attachment link forming throat latch 75 are adapted to release the horse when the halter is accidentally caught in a tree limb or branch.

The key features of the omnidirectionally reflective horse harness or horse halter include, in combination, the features set forth below:

1. a horse harness, halter or tether comprised of a central cylindrical braided rope core composed of braided nylon or polypropylene fibers capable of sustaining tensile forces developed by applied tensile loads;

2. the central cylindrical braided rope core being covered substantially with a cylindrically reflective braided sleeve formed by cylindrically braiding narrow width reflected strips, formed from knitted, woven or braided nylon, or polypropylene narrow width strips, having thermally bonded flexible retroreflector sheets bonded to the surface thereof;
3. each of the flexible retroreflector sheets being prepared by bonding corner cube geometry retroreflectors to a flexible polymeric sheet using a transparent binder;
4. such flexible retroreflector sheets alternately being prepared by bonding microsphere geometry retroreflectors to a metallized reflective flexible polymeric sheet using a transparent binder;
5. twist and flexure forces acting on the omnidirectionally reflective harness or halter being accommodated by the braided construction of the cylindrical reflective sleeve;
6. the cylindrical braided sleeve-covered harness, halter or tether substantially reflecting incident light back in the same direction as the incident light, clearly indicating the whereabouts of the tether's handle and halter central portion;
7. the omnidirectionally reflective harness, halter or tether providing an increased margin of safety for horses and their owners while horse riding in dimly lit environments, such as a paddock or field, or inclement weather conditions, where pedestrians or other horse riders are encountered.

The abrasion resistant omnidirectionally reflective horse harness, halter or lead disclosed herein can be modified in numerous ways without departing from the scope of the invention. For example, at least one strip of the central braded rope core, in addition to the crown, can be composed of leather. The horse harness, halter or lead can be integral with the central rope core or detachable therefrom via fastening means such as trigger snap hardware, stainless steel clamp and snap hardware, swivel snap hardware, in the conventional way. These and other modifications are intended to fall within the scope of the invention, as defined by the subjoined claims.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A reflective horse halter, comprising:
   a. a central cylindrical braided rope core operable to sustain substantial tensile forces;
   b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
   c. said narrow width reflective strips comprising a woven or knitted narrow width strip and a flexible retroreflective sheet, said woven or knitted narrow width strip having a show surface, and said flexible retroreflective sheet being thermally bonded onto said show surface thereof;
   d. said flexible retroreflective sheet having retroreflectors bonded thereto with a transparent bond layer; and
   e. said halter having a proximal end and a distal end, the proximal end being braided to form an omnidirectionally reflective connection behind the neck of the horse, and the distal end being looped and braided and attached to a metallic hardware component operable with said rope core and surrounding said braided sleeve to form a halter having omnidirectional reflectivity.

2. A reflective horse halter as recited by claim 1, wherein said central cylindrical braided rope core comprises braided nylon fibers.

3. A reflective horse halter as recited by claim 1, wherein said central cylindrical braided rope core comprises braided polypropylene fibers.

4. A reflective horse halter as recited by claim 1, wherein said cylindrical reflective braided sleeve is braided at a braid angle of 5 to 10 degrees.

5. A reflective horse halter as recited by claim 1, wherein each of said narrow width reflective strips has a width of 0.0065 to 0.25 inches.

6. A reflective horse halter as recited by claim 1, wherein said flexible retroreflective sheet is thermally bonded to said woven or knitted narrow width strip with polyvinyl chloride.

7. A reflective horse halter as recited by claim 1, wherein said flexible retroreflective sheet is thermally bonded to said woven or knitted narrow width strip with polyvinyl acetate.

8. A reflective horse halter as recited by claim 1, wherein said flexible retroreflective sheet is thermally bonded to said woven or knitted narrow width strip with polyurethane.

9. A reflective horse halter as recited by claim 1, wherein said flexible retroreflective sheet comprises a plurality of corner cube retroreflectors.

10. A reflective horse harness as recited by claim 1, wherein said flexible retroreflective sheet comprises a plurality of microsphere retroreflectors bonded to a light-reflecting sheet.

11. A reflective horse halter as recited by claim 1, comprising a plurality of sections of omnidirectional reflectors attached to halter sections through adjustable links and a break away link, for providing dusk hour or night time visibility to walkers and other horse riders carrying a light source.

12. A reflective horse halter as recited by claim 1, comprising a plurality of sections, said sections having omnidirectional reflectors incorporated therein, except for a crown section extending over the horse's head and immediately behind the horse's ears, said horse halter having a non-reflective, leather section as the crown section and being connected to adjustable links, at least one of which is a break away link, for providing dusk hour or night time visibility to walkers and other horseback riders carrying a light source.

13. A reflective horse lead, comprising:
   a. a cylindrical braided rope core operable to sustain substantial tensile forces;
   b. a cylindrical reflective braided sleeve comprising three or more narrow width reflective strips that are braided at a shallow cylindrical braid angle, said cylindrical reflective braided sleeve being operable to surround said central cylindrical braided rope core thereby providing omnidirectional reflectivity;
   c. said narrow width reflective strips comprising a woven or knitted narrow width strip and a flexible retroreflective sheet, said woven or knitted narrow width strip having a show surface, and said flexible retroreflective sheet being thermally bonded onto said show surface thereof;
   d. said flexible retroreflective sheet having retroreflectors bonded thereto with a transparent bond layer; and
   e. said lead having a proximal end and a distal end, the proximal end being braided to form omnidirectionally reflective terminus, and the distal end being looped and braided and attached to a metallic hardware component operable to connect said lead to a halter.

14. A reflective horse lead, as recited by claim 13, wherein said metallic hardware component is adapted for detachable connection with said halter.

15. A process for manufacture of a reflective horse harness, comprising the steps of:
- a. selecting a braided nylon or polypropylene cylindrical central rope, said cylindrical central rope having a proximal end, a distal end, and an external surface;
- b. forming a terminus at said proximal end of said central rope;
- c. attaching said distal end to a mechanical hardware component, said mechanical hardware component operating with said central rope to form an attachment to a bridal bit ring or other section of a horse harness;
- d. selecting a flexible polymer sheet;
- e. coating said flexible polymer sheet with a plurality of retroreflectors using a transparent binder to form a retroreflector coated flexible polymer sheet;
- f. thermally bonding said retroreflector coated flexible polymer sheet to a woven or knitted narrow width strip to form a narrow width reflective strip;
- g. braiding at least three of said narrow width reflective strips at a shallow cylindrical braid angle to form an omnidirectionally reflective sleeve having a braided construction;
- h. applying a transparent flexible polymeric abrasion resistant conformal coating to substantially cover said omnidirectionally reflective sleeve; and
- i. covering said handle and said external surface of said cylindrical central rope with said omnidirectionally reflective sleeve to provide said horse harness with omnidirectional reflectivity;

said omnidirectionally reflective horse harness being operable to sustain substantial tensile forces, and to accommodate twist and flexure forces due to strength and movement afforded by said braided construction of said omnidirectionally reflective sleeve.

* * * * *